April 22, 1969           R. J. HELLE           3,439,646

REARVIEW MIRROR WITH ADJUSTMENT GUIDES

Filed May 25, 1965           Sheet _1_ of 2

INVENTOR.
ROBERT J. HELLE

BY    *Hill, Sherman, Meroni, Gross & Simpson* ATTORNEYS

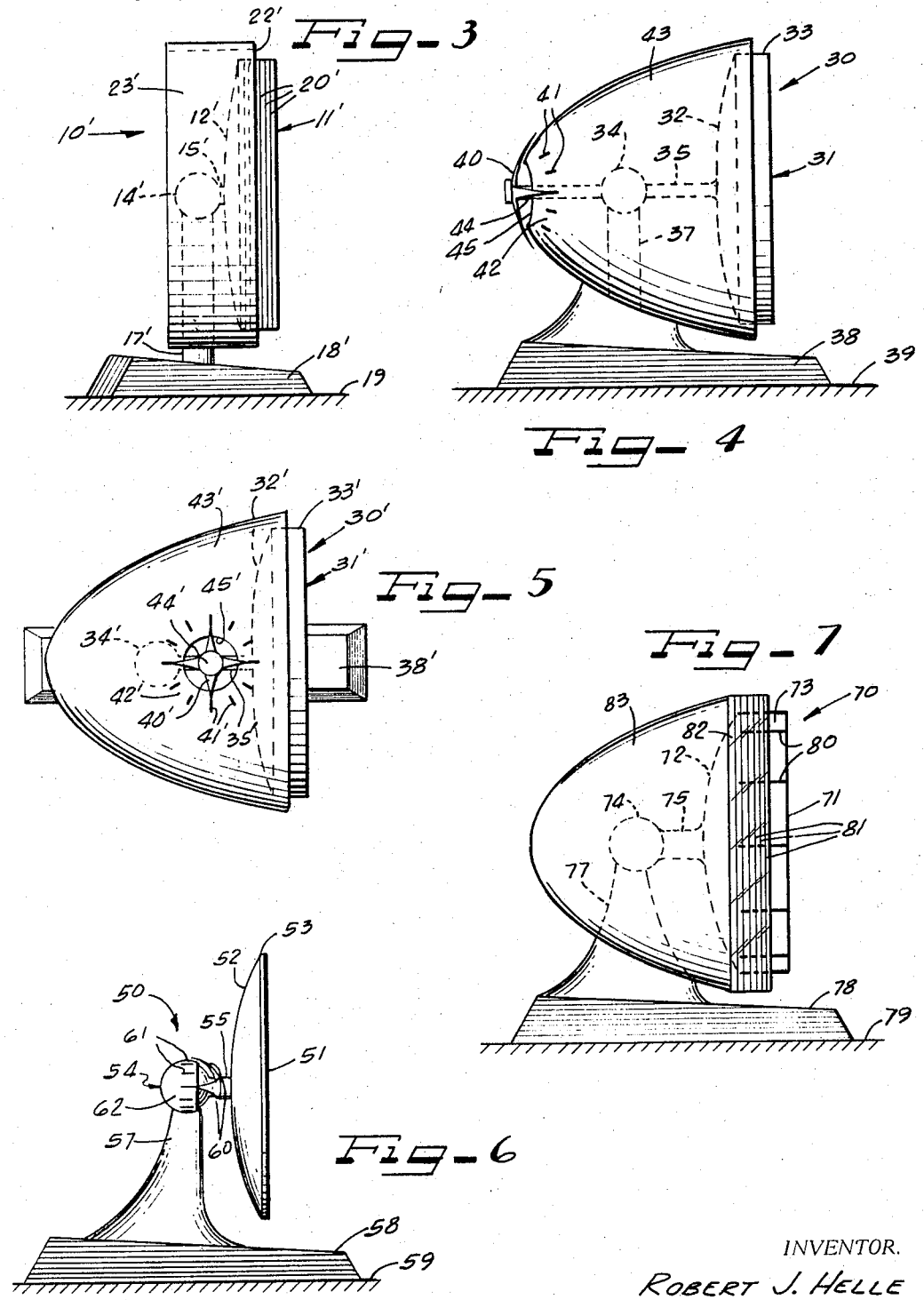

United States Patent Office 3,439,646
Patented Apr. 22, 1969

3,439,646
REARVIEW MIRROR WITH ADJUSTMENT GUIDES
Robert J. Helle, 371 De Leon Vista,
Crystal Lake, Ill. 60014
Filed May 25, 1965, Ser. No. 458,543
Int. Cl. G09f 9/00; B60q 9/00; A47g 1/24
U.S. Cl. 116—124                    2 Claims

ABSTRACT OF THE DISCLOSURE

A rearview mirror assembly comprises a pedestal, a mirror mounted pivotally on the pedestal, means such as a housing or ring stationary relative to and encircling the rim of the mirror, and adjacent annular areas of the stationary member and the mirror rim having guide means and indexing means coactive to show the pivotally adjusted attitude of the mirror.

---

This invention relates to improvements in rearview mirrors such as are mounted on the fenders of automobiles or trucks outside of the driver's enclosure of the vehicle.

One of the problems in the use of these mirrors resides in that they must be adjustable for proper alignment with the line of vision of the driver. Often such a mirror is moved out of adjustment as during cleaning or by inadvertent contact during servicing of the vehicle. Further, where the same vehicle is driven by different persons it may be necessary to readjust the rearview mirror to suit the individual driver. Often by reason of the mirror being mounted at such a distance from the driver's seat, it cannot be satisfactorily adjusted except by a second person outside of the driver's compartment, or by several cut and try attempts by the driver getting in and out of the driver's seat to make the adjustment. With conventional forms of rearview mirror, this adjustment process must be gone through every time a readjustment must be made.

An important object of the present invention is to provide new and improved means in a rearview mirror construction enabling substantially accurate repositioning or duplication readjustment of the mirror once a preferred adjustment has been found for any given driver of the vehicle.

Another object of the invention is to provide new and improved adjustment guiding means enabling quick readjustment of an exterior rearview mirror to a desired setting where no means are available for this purpose inside the vehicle for manipulation from the driver's seat.

Another object of the invention is to provide new and improved means for predetermining adjustments in rearview mirrors and which will take advantage of parts normally present in such mirrors and their mounts and will not add appreciably to the cost of such mirrors.

Still another object of the invention is to provide new and improved, simple, positive, easily understandable means for guiding the adjustment of a fender mounted rearview mirror assembly of a vehicle.

Other objects, features and advantages of the invention will be readily apparent from the following detailed description of certain preferred embodiments thereof taken in conjunction with the accompanying drawings, in which:

FIGURE 3 is a side elevational view of a modification;

FIGURE 4 is a side elevational view of another modification;

FIGURE 5 is a top plan view of a further modification;

FIGURE 6 is a side elevational view of still another modification; and

FIGURE 7 is a side elevational view of a yet further modification.

Figure 1:
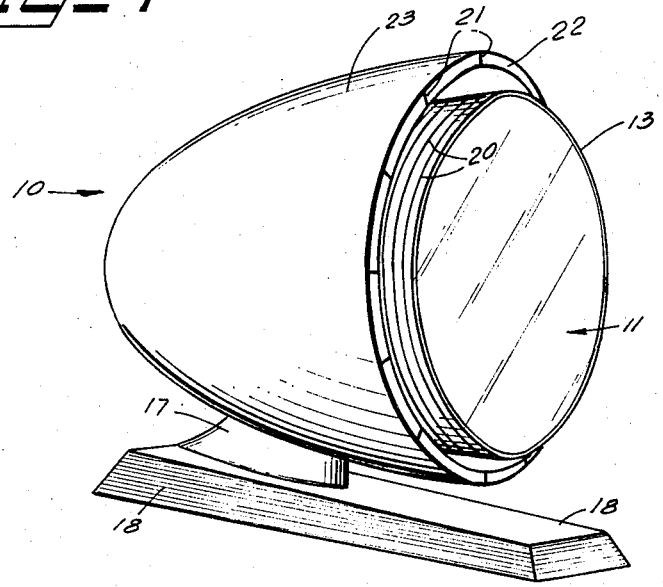
FIGURE 1 is an isometric view of a rearview mirror embodying features of the invention.
Figure 2:
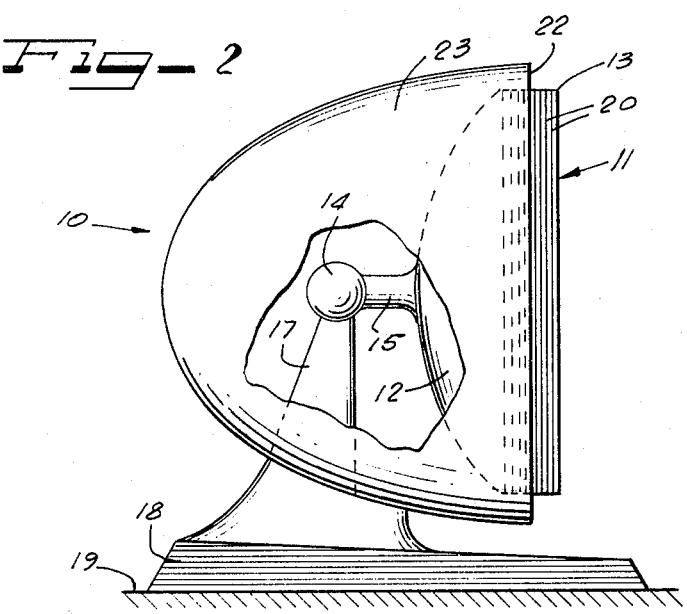
FIGURE 2 is a side elevational view of the mirror assembly of FIGURE 1.

Upon reference to FIGURES 1 and 2, a rearview mirror assembly 10 to which the present invention is applied includes a mirror 11 carried by a mirror back 12 having a rim 13 of desirably substantially cylindrical form. An adjustable mounting for the mirror comprises, in this instance, universal ball joint 14 attached centrally to the mirror back 12 by a stem 15 and to a pedestal 17 which is carried by a base 18 adapted to be attached to a vehicle fender 19 or the like in proper position so that the mirror 11 can be adjusted to align with the vehicle driver's line of vision.

According to the present invention, means are provided which will automatically afford a visual guide of the adjustment of the mirror 11 for the optimum convenience of a particular driver of the vehicle so that the adjustment may be duplicated quickly by repositioning the mirror if, for any reason, it is moved out of such adjustment for that driver. In one desirable form, the adjustment indicating means comprise guide means functionally integral with the mirror 11 and in the form of a series of spaced parallel annular stripes 20 on the perimeter or circumference of the rim 13. These stripes may be of any desired form and delineation such as grooves or ribs and are desirably sufficiently differentiated as by color, which may be a single color or a pattern of different colors for the different guide stripes, to enable quick and ready differentiation. There may be as many of the guide stripes 20 as preferred in an area band about the mirror.

Cooperatively related to the guide area integrally associated with the mirror, are stationary index means with respect to which the respective guide stripes 20 are arranged to be oriented to indicate a relatively adjusted relation. In a desirable form, the index means comprise a dial like arrangement of index marks 21 located on a stationary annular surface 22 located in spaced correlated relation about the guide area perimeter of the rim 13. Conveniently the index dial surface 22 comprises an end surface of preferred width on a substantially streamlined wind deflector housing 23 fixed on the pedestal 17 and housing the mirror back 12 and the universal pivot joint 14. Although there may be as few or as many of the index marks 21 as desired, a convenient arrangement comprises 12 such marks, generally corresponding to the hour positions on a clock dial. Through this arrangement, when a preferred adjustment of the mirror 11 has been affected by moving it about the joint 14 until it suits the driver's line of vision, a relative adjustment setting will be observed in respect to the guide stripes 20 and the index marks 21 wherein one of the guide marks or stripes 20 will be in a set relation to one of the several index indicia or marks 21. By remembering this particular orientation or setting, the driver can quickly duplicate the adjustment by simple readjustment maneuver of the mirror 11 by moving the same guide stripe 20 into registration with the same index mark 21.

In the modificaiton of FIGURE 3, the principles of the invention are embodied in a rearview mirror assembly 10' which is substantially the same as the mirror assembly 10 except that it is of a more compact arrangement in which the stationary member 23' comprises a ring about the mirror mount having thereon the index means correlated with the guide means on the mirror. Primed reference numerals indicate elements corresponding to the same elements in the former FIGURES 1 and 2 and therefore, in the interest of brevity, such elements will not be repeated, but the detailed description in respect of FIGURES 1 and 2 will be understood to apply to FIGURE 3.

FIGURE 4 depicts a rearview mirror construction 30 similar in most respects to the basic structure of assembly 10, but having another form of adjustment indicating means. Thus, the rearview mirror assembly 30 comprises a mirror 31 mounted in a mirror back 32 having a mirror embracing rim 33 and attached to a universal joint 34 by an axial stem 35. The jont 34 is supported by pedestal 37 carried by a base 38 and adapted to be mounted on a suitable part of the vehicle such as a fender 39.

In the rearview mirror structure 30, adjustment indicating means comprise a guide pointer 40 of desirably four-pointed star shape correlated to index indicia comprising an annular series of marks 41 on a dial area 42 on a stationary support such as the end of a tapered protective housing shell 43.

Coordinated movement of the guide pointer 40 to orient one of its plurality of points with one of the index marks 41 to indicate adjustment of the mirror 31, comprises an extension 44 of the mirror mounting stem 35 to the opposite side of the pivot joint 34 and extending through a suitable clearance aperture 45 in the index dial end of the housing 43. Through this arrangement, any adjustment of the mirror relative to the housing 43 is simultaneously indexed for ready repositioning to duplicate the adjustment.

FIGURE 5 shows a variation of the form of the invention depicted in FIGURE 4, and primed reference numerals indicate the same parts and description is therefore abbreviated with the understanding that the same description applies to the same parts as given for FIGURE 4. In the rearview mirror assembly 30′ of FIGURE 5, however, the star-shaped guide pointer 40′ is associated with an index dial area 42′ located on the top of the stationary housing 43′ about a clearance aperture 45′ through which extends a supporting stem extension 44′ from the mirror supporting stem 35′. Adjustments of the mirror 31′ are reflected in corresponding relative adjustments of the guide pointers 40′ in respect to the index marks 41′.

FIGURE 6 depicts another form of rearview mirror assembly 50 embodying the principles of the present invention, comprising a mirror 51 carried by a backing 12 having a mirror-protective rim 53 and connected to a universal pivot joint 54 by means of a central, axial stem 55. Fixed support for the joint 54 is provided by a pedestal 57 on a base 58 which is adapted to be attached to a suitable part of the vehicle such as a fender 59.

In the reaview mirror assembly 50 adjustment indication is afforded by means comprising guide fingers 60 associated with the mirror 51 by being mounted on the supporting stem 55 and coactive with suitable indicia marks 61 carried on a stationary member 62 comprising a fixed portion of the pivot joint assembly 54 attached to the pedestal 57. As a result, any adjustment of the mirror 51 is reflected in an adjustment indicating orientation of one of the plurality of guide pointers 60 with one of the series of spaced index marks 61, enabling duplication readjustment by reorienting that particular pointer with the particular index mark observed in registration when the initial adjustment has been affected.

In the from of the invention shown in FIGURE 7, a rearview mirror assembly 70 is shown which is generally similar to the mirror assembly 10 but discloses a further variation in the adjustment indication means. In the assembly 70, a mirror 71 is carried by a mirror back 72 having a mirror embracing rim 73 and connected with a universal pivot joint 74 by means of an axial stem 75. A pedestal 77 supports the joint 74 and is carried by a base 78 adapted to be mounted on a suitable portion of a vehicle such as a fender 79.

In the assembly 70 the adjustment indicating means comprise an annularly spaced series of axially extending guide marks 80 on the perimeter of the rim 73 coactively related for indicating adjustment of the mirror with circumferential axially spaced index marks comprising stripes disposed in suitable series on a stationary ring 82 disposed in spaced relation about the rim 73 and mounted on a streamlined air deflector housing 83 carried by the pedestal 77. Desirably, the stationary index carrier comprises a transparent ring on which the index stripes 81 are carried either on the inner or outer perimeter and the guide marks 80 are visible through the transparent index ring so that adjustment indicating orientation of any one of the guide marks 80 with any one of the index marks 81 with which it may register can be readily visualized. Thereby, duplication readjustment can be readily effected by matching up or reorienting that guide mark 80 with that index mark 81 with which it was observed in registration for the particular mirror adjustment.

It will, therefore, be apparent that all forms of the invention are applied to simple digitally manipulative rearview mirrors, that is, wherein the mirror is adjusted by direct manipulation thereof as distinguished from that class of mirrors in which linkages and lever arrangements are utilized enabling adjustment from within the driver's compartment or from the driver's seat by a manipulating handle or knob located in the driver's compartment of the vehicle and very little used because of the substantial costs involved in the price of the mechanisms and installation expenses.

All forms of the invention embody the simple concept of guide means coordinated in movement with the mirror registering with index means on a stationary associated part to indicate any desirable adjustment; no mechanism is involved which might get out of order or fail; exceedingly low cost is a distinct advantage; the adjustment indicator means are easily understood and require no mechanical aptitude; and duplication of adjustment settings is accomplished by quick manipulative action no different from that normally employed in making adjustments of this kind of rearview mirror.

It will be understood that modifications and variations may be effected without departing from the scope of the novel concepts of the present invention.

I claim as my invention:

1. A rear view mirror assembly comprising,
   a circular mirror formed with a back and a cylindrical rim portion,
   a generally cylindrical housing,
   universal joint means attached between the mirror back and the housing to support the mirror for movement relative to the housing,
   a series of axially spaced parallel annular indicia formed on and encircling the cylindrical rim portion of said mirror, and a series of radial index marks formed on the front edge of said cylindrical housing,
   said front edge of said cylindrical housing overlying the cylindrical rim portion of said mirror and being spaced therefrom when the mirror is in centered position,
   adjustment of said mirror to a particular tilted position registering one of said annular indicia and one of said radial index marks and enabling rapid duplication of said tilted position.

2. A rear view mirror assembly comprising,
   a circular mirror formed with a back and a cylindrical rim portion,
   a generally cylindrical housing formed with a transparent front portion,
   universal joint means attached between the mirror back and the housing to support the mirror for movement relative to the housing, a series of axially spaced parallel annular indicia circumferentially formed on the transparent portion of said housing, and a series of spaced axially extending index marks formed on the cylindrical rim portion of the mirror, said transparent front portion of said cylindrical housing overlying the cylindrical rim portion of said mirror and being spaced therefrom when the mirror is in centered position, adjustment of said mirror to a particular tilted position registering one of said annular indicia and one of said index marks and enabling rapid duplication of said tilted position.

References Cited

UNITED STATES PATENTS

| | | | |
|---|---|---|---|
| 2,685,859 | 8/1954 | Donnell | 248—483 X |
| 2,789,464 | 4/1957 | Williams | 350—288 |
| 3,024,049 | 3/1962 | Tranas | 248—483 X |
| 3,348,425 | 10/1967 | Noord | 248—483 |
| 3,337,177 | 8/1967 | Talbot | 248—483 |

DAVID H. RUBIN, *Primary Examiner.*

U.S. Cl. X.R.

115—31; 116—28; 248—481; 350—288